Aug. 9, 1938.   C. L. BANKS   2,126,086
VEHICULAR SPRING
Filed Jan. 12, 1937
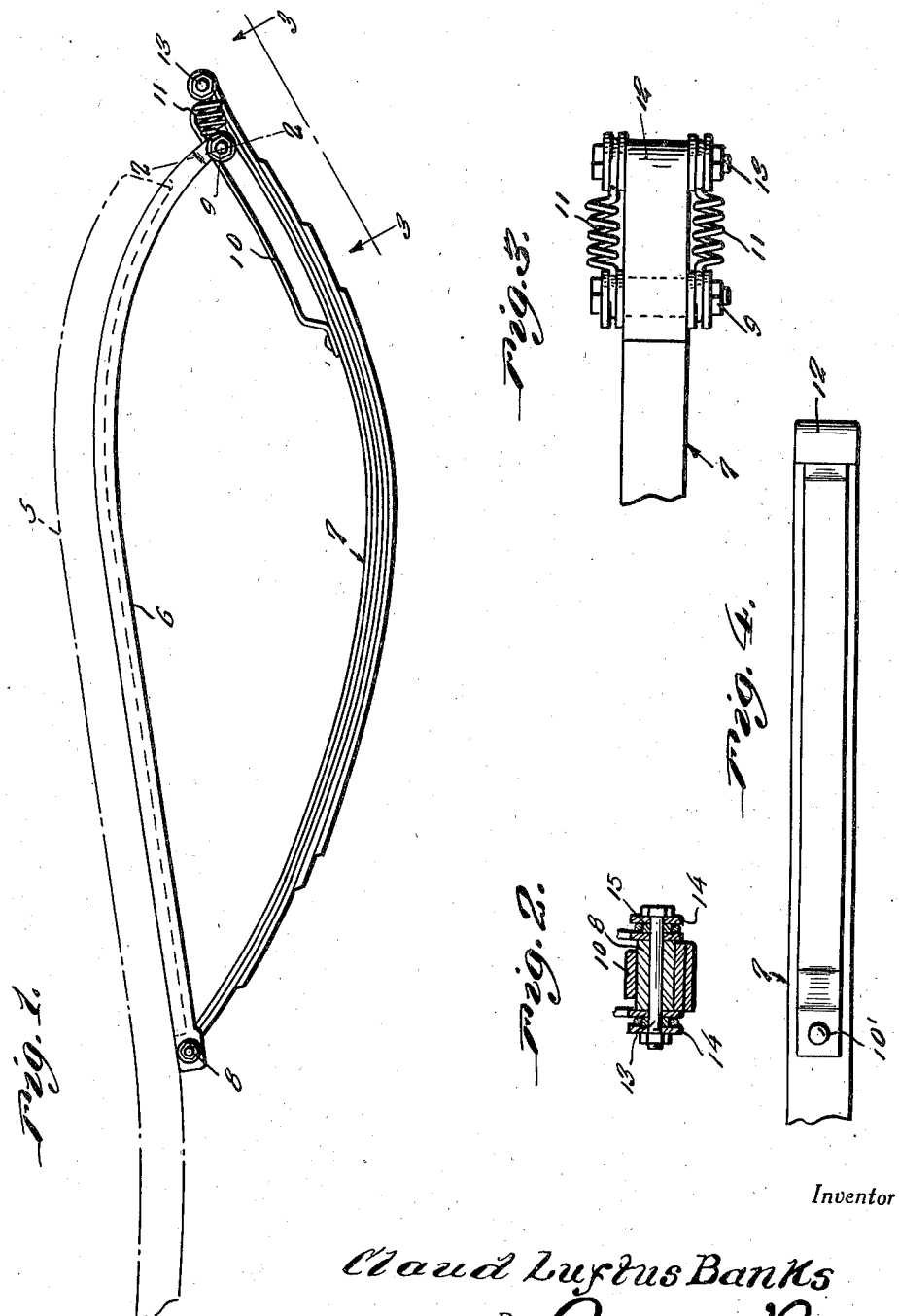
Inventor
Claud Luftus Banks
By Clarence A. O'Brien
Hyman Berman
Attorneys Patented Aug. 9, 1938

2,126,086

UNITED STATES PATENT OFFICE 2,126,086

VEHICULAR SPRING

Claud Luftus Banks, Canton, Ohio

Application January 12, 1937, Serial No. 120,310

2 Claims. (Cl. 267—56)

This invention relates broadly to a vehicular spring, and an object of the invention is to provide an improved mounting for the spring.

The invention, together with its objects and advantages, will be best understood from a study of the following description taken in connection with the accompanying drawing, wherein:—

Figure 1 is a side elevational view illustrating the application of the invention.

Figures 2 and 3 are detail views taken substantially on the lines 2—2 and 3—3, respectively, of Figure 1; and Figure 4 is a fragmentary top plan view of an end portion of the spring.

Referring to the drawing by reference numerals, it will be seen that the end portion of a chassis bar of an automobile is indicated by broken lines and by the reference numeral 5.

In accordance with the present invention, the improved spring assembly comprises a bar 6 that conforms somewhat to the shape of the end of the chassis bar 5 and is bolted, welded, or otherwise secured to said end of the chassis bar.

The numeral 7 indicates generally a longitudinal vehicular spring of the leaf type which at one end is pivoted to the inward end of the bar 6 as at 8.

At the outward or free end thereof the member 6 is bifurcated and between the extensions thereof formed by said bifurcation there is mounted a roller 8 supported on a bearing bolt 9.

Secured to the uppermost leaf of the spring 7 at the outer or free end thereof is a guide member 10 in the form of an elongated strap of metal riveted or otherwise secured at one end as at 10' to the spring and at its relatively opposite end suitably engaged with an eye 12 provided at the free end of the uppermost leaf of the spring 7, as by inserting the end of the guide under the open edge of the eye.

The roller 8 is accommodated between the uppermost leaf of the spring 7 and the guide member 10 as shown in Figures 1 and 2, thus providing a connection between the free end of the spring 7 and the member 6, which will permit the free end of the spring 7 to move relative to the member 6 incidental to the vehicular wheel passing over a stone, hump, or other obstruction in the road to the end that the riding qualities of the vehicle will be greatly improved upon.

For absorbing shocks there are provided a pair of springs 11 which at one end are suitably engaged with a bolt 13 that extends through the eye 12 of the spring 7 and at a relatively opposite end have end portions disposed about spacers 15 disposed on the bolt 9 between the sides of the member 6 and washers 14. (See Figure 2.)

It will thus be seen that as the spring 7 is caused to straighten out in the direction of its length, springs 11 will be caused to expand, and as the spring 7 returns to its normal longitudinally curved position, springs 11 will contract to assist in returning the spring 7 to its normal condition and at the same time to absorb shock incidental to the longitudinal extension or retraction of the spring 7.

It is thought that a clear understanding of the construction, utility, and advantages of the invention will be had without a more detailed description.

Having thus described the invention what is claimed as new is:—

1. In combination with a vehicular chassis bar, a longitudinal, longitudinally curved leaf spring for the vehicle pivoted at one end to said chassis bar inwardly from an end of the latter, said spring having an eye at its free end, said chassis bar at its free end being bifurcated, a roller journaled in the bifurcated end of the chassis bar, a guide member having one end secured to the spring and its opposite end forced between the upper leaf of the spring and said eye, said guide having its intermediate portion spaced from the spring to accommodate said roller between said guide member and said spring, as and for the purpose specified.

2. In combination with a vehicular chassis bar, a longitudinal, longitudinally curved leaf spring for the vehicle pivoted at one end to said chassis bar inwardly from an end of the latter, said spring having an eye at its free end, said chassis bar at its free end being provided with a roller, a guide member having one end secured to the spring and its opposite end forced between the upper leaf of the spring and said eye, said guide having its intermediate portion spaced from the spring to accommodate said roller between said guide member and said spring, a pin in said eye, and spring devices engaged at one end with the ends of said pin and at a relatively opposite end with said roller for yieldably urging the spring into a longitudinally curved condition.

CLAUD LUFTUS BANKS.